United States Patent [19]

Pouring et al.

[11] Patent Number: 4,788,942
[45] Date of Patent: Dec. 6, 1988

[54] INTERNAL COMBUSTION ENGINE USING DYNAMIC RESONATING AIR CHAMBER

[75] Inventors: Andrew A. Pouring, Edgewater; Daniel G. Ferer, Harwood, both of Md.

[73] Assignee: Sonex Research, Inc., Annapolis, Md.

[21] Appl. No.: 880,293

[22] Filed: Jun. 30, 1986

[51] Int. Cl.[4] .......................... F02B 17/00; F02B 23/08
[52] U.S. Cl. ........................ 123/26; 123/219; 123/259; 123/289; 123/291; 123/295; 123/430; 123/667
[58] Field of Search ............... 123/259, 276, 279, 289, 123/291, 295, 193 P, 657, 660, 667, 430, 218, 242, 219, 26

[56] References Cited

U.S. PATENT DOCUMENTS

| | | | |
|---|---|---|---|
| 1,668,471 | 5/1928 | Summers | 123/657 |
| 2,991,766 | 7/1961 | Candelise | 123/26 |
| 3,283,751 | 11/1966 | Goossak et al. | 123/259 |
| 3,923,015 | 12/1975 | Mukai et al. | 123/259 |
| 3,976,038 | 8/1976 | Stahl | 123/257 |
| 4,060,059 | 11/1977 | Blaser | 123/568 |
| 4,067,301 | 1/1978 | Jarry | 123/26 |
| 4,235,203 | 11/1980 | Thery | 123/193 P |
| 4,370,959 | 2/1983 | McNair, Jr. | 123/430 |
| 4,465,033 | 8/1984 | Blaser | 123/279 |
| 4,485,779 | 12/1984 | Spurk | 123/289 |
| 4,557,231 | 12/1985 | Thery | 123/279 |
| 4,592,318 | 6/1986 | Pouring | 123/295 |

FOREIGN PATENT DOCUMENTS

| | | |
|---|---|---|
| 95052 | 11/1923 | Austria . |
| 412194 | 4/1925 | Fed. Rep. of Germany . |
| 2502931 | 7/1975 | Fed. Rep. of Germany ...... 123/218 |
| 40-10001 | 5/1965 | Japan . |
| 49-125710 | 12/1974 | Japan . |
| 52-77906 | 6/1977 | Japan . |
| 59-530 | 1/1984 | Japan .................................. 123/279 |
| 956828 | 9/1982 | U.S.S.R. . |
| 1591125 | 10/1977 | United Kingdom . |

OTHER PUBLICATIONS

MTZ Motortechnische Zeitschrift 45 (1984), Prof. Dr.--Ing. Joseph H. Spurk and Dr. Ing. Rainer Andra, pp. 75-80.

Primary Examiner—Andrew M. Dolinar
Attorney, Agent, or Firm—Bacon & Thomas

[57] ABSTRACT

An internal combustion engine includes a moving piston within a combustion chamber that is temporarily divided into two zones when the piston is at and near its minumum volume position. Fuel is confined to a first zone where the fuel is ignited to generate combustion wave energy that drives gas within the second zone in Helmholtz resonance through a restricted passageway. Air from the second zone is periodically expanded into the first zone through the passageway to improve the combustion process in the first zone before the piston moves substantially away from its minimum volume position.

45 Claims, 6 Drawing Sheets

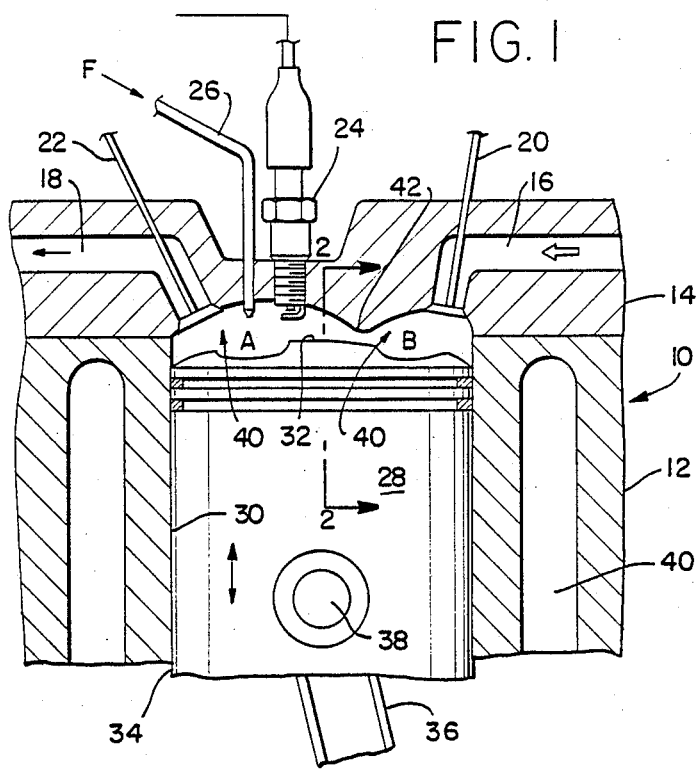
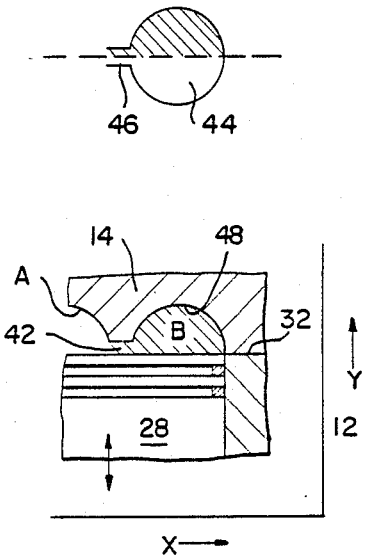
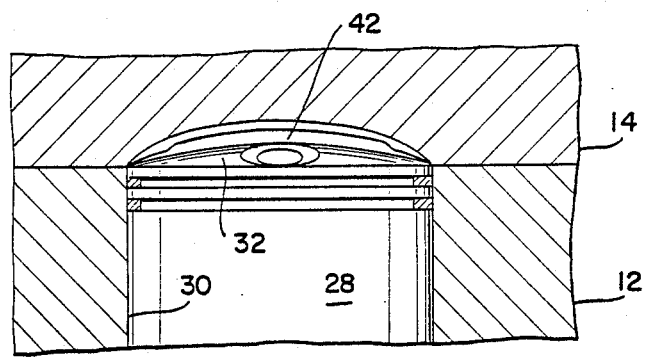
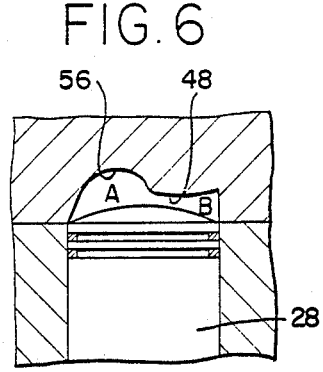
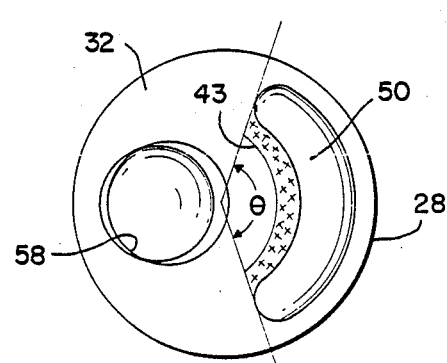
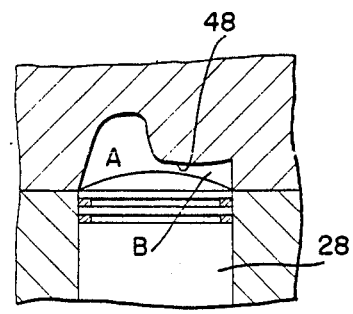

$$RQI = \frac{(IHP)K}{(ISFC)(UHC)(CO)}$$

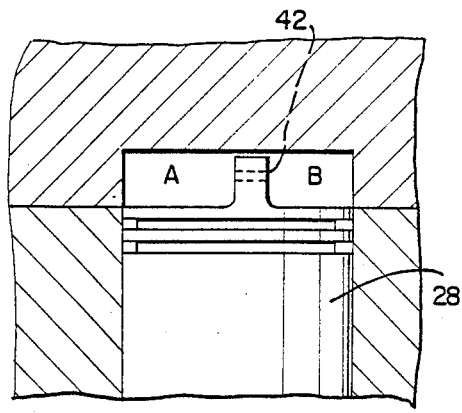
FIG. 25
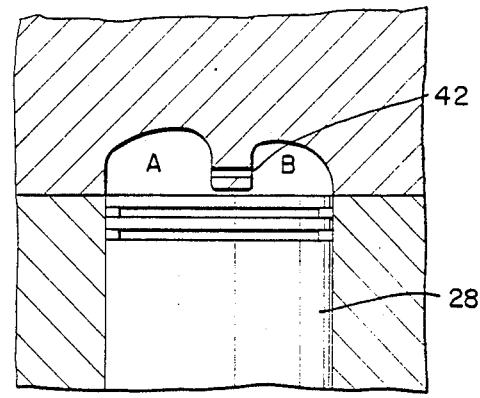
FIG. 26
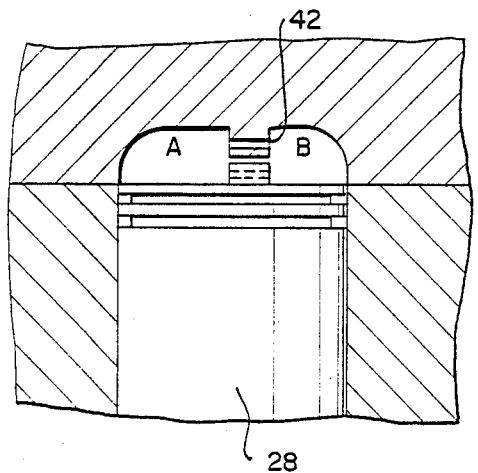
FIG. 27
FIG. 28
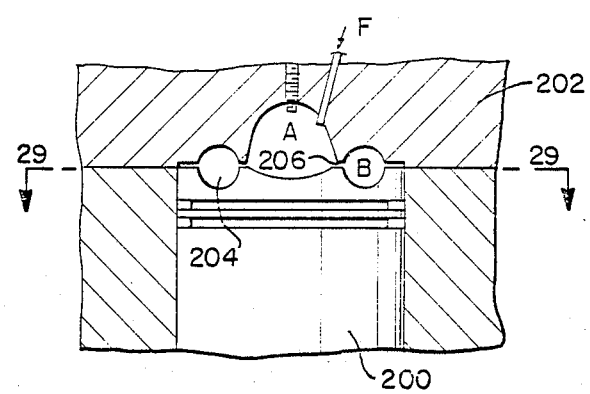
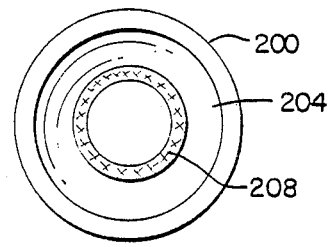
FIG. 29

INTERNAL COMBUSTION ENGINE USING DYNAMIC RESONATING AIR CHAMBER

FIELD OF THE INVENTION

This invention relates to internal combustion piston engines and more specifically to a combustion chamber configuration and a combustion process having application in such engines.

BACKGROUND OF THE INVENTION

Related Background Art

This invention constitutes an improvement to the invention described in U.S. Pat. No. 4,592,318, the disclosure of which is incorporated herein by reference. By way of summary, the invention described in the aforementioned U.S. patent comprises a combustion chamber geometry for an internal combustion engine that produces controlled burning of fuel by prolonging the supply of air to the combustion zone over the combustion/expansion part of the engine operating cycle. Essentially, an air chamber disposed in the piston member of the engine is located adjacent the combustion chamber and communicates with the latter through a restricted passageway. The air chamber and passageway are configured to behave as a Helmholtz resonating chamber when driven by combustion vibrational wave energy during the operating cycle of the engine. The resultant resonance of the gas in the air chamber causes periodic outflow of air into the working chamber during the entire combustion process. A specific dimensional and mathematical relationship between combustion and air chamber elements was disclosed in the above-mentioned patent to permit application of the inventive concept to virtually any combustion chamber that is defined at least in part by the reciprocating piston.

The above U.S. patent furthermore describes additional background of the invention, including tracing the historical development of combustion systems using combustion wave energy to cause controlled passive pumping of air from a reservoir chamber into a combustion zone of an internal combustion engine during the combustion cycle. The invention described in the patent relies upon the provision of an air chamber adjacent the working face of the piston to provide a fixed volume reservoir for air that moves with the piston as it reciprocates within the combustion chamber. While such a fixed volume chamber contributed to the improvement of the combustion process utilizing combustion wave energy, it has been discovered by the present inventor that, under certain operating conditions and with certain engine configurations, a resonating air chamber disposed within the piston is not the optimum manner in which to utilize combustion with energy to produce rapid reaction of the fuel charge. Moreover, it has been observed that maintaining the resonating air chamber free of substantial contamination with fuel is problematic in certain engine configurations, particularly certain production engines in which it is desired to reconfigure the combustion chamber to utilize the invention disclosed in the above-mentioned U.S. patent.

SUMMARY OF THE INVENTION

The present invention permits utilization of combustion wave energy to enhance the combustion process under conditions when establishment of a resonating air chamber within a piston is unfeasible or undesirable for any reason. In brief, the present invention contemplates the establishment of a resonating air chamber within the combustion chamber itself by dynamically dividing the combustion chamber area into two connected zones when the piston of the engine is at and near its minimum volume position, whereby the appropriate geometric and dimensional relationships are temporarily established to cause driving of an air chamber in resonance by combustion wave energy to cause periodic discharge of air from the chamber into the combustion zone where substantially all of the fuel of the charge being combusted is located. The resonating air chamber is established only when the moving piston of the engine is at and near its minimum volume position and does not otherwise exist within the combustion chamber. The charge is manipulated so that virtually all of the fuel of the charge is located within the first or "ignition" zone established in the divided combustion chamber, and air with an insignificant amount of fuel is in the second or "resonating" zone at the moment of ignition of the charge. Combustion vibrational wave energy generated in the ignition chamber drives the resonating chamber in resonance through a restricted connecting pasageway that itself may be temporarily formed by the working face area of the piston as it approaches an adjacent fixed wall surface of the combustion chamber, or may be permanently provided in the combustion chamber.

The invention, among other benefits, reduces combustion chamber peak pressures, permits control of knock and reduces undesirable engine exhaust emissions.

The invention has application in reciprocating and rotary piston engines, as well as Otto, Diesel, four-stroke and two-stroke combustion cycles. Since resonant wave interaction enables leaner combustion than conventional combustion cycles, the overall efficiency of the combustion process is improved.

All of the foregoing will be evident from the ensuing description of preferred embodiments of the invention and the appended claims.

BRIEF DESCRIPTION OF THE DRAWINGS

FIG. 1 is an elevational, partial sectional view schematically illustrating a combustion chamber of an internal combustion engine incorporating an embodiment of the invention;

FIG. 2 is a view taken generally along line 2—2 of FIG. 1;

FIG. 3 is a plan view of the piston shown in FIG. 1;

FIGS. 4 and 5 illustrate how the Helmholtz resonating chamber parameters are calculated in accordance with the invention;

FIGS. 6–12 illustrate different embodiments of the invention;

FIGS. 25-29 show alternate embodiments of the invention.

DESCRIPTION OF PREFERRED EMBODIMENTS OF THE INVENTION

Figure 8:
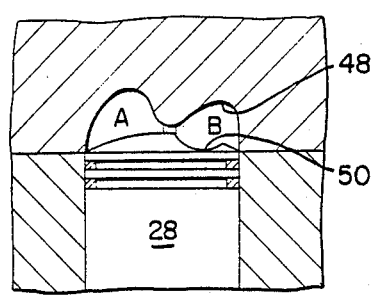

With reference to the appended drawings, in FIG. 1 a schematic illustration of a combustion chamber embodying the invention is shown within an internal combustion engine 10 comprising generally a block 12, a head 14, an intake port 16, an exhaust port 18, intake and exhaust valves 20, 22, respectively, a spark plug 24, and a fuel injector 26. A piston 28 is disposed in cylinder 30 for reciprocating movement and includes a working face 32 and a guide portion 34. The piston 28 is pivotally attached to a connecting rod 36 through a wrist pin or gudgeon 38 for transmitting motion and output power through an engine crankshaft (not shown). Appropriate water cooling chambers 40 may be provided within the block 12. Assuming that the engine is a four-stroke Otto cycle engine, its operating cycle will be well known to those skilled in the art, and includes intake, compression, expansion (working) and exhaust strokes for each operating cycle of the engine. In a fuel injected engine, air is aspirated through the intake port and fuel is admitted through fuel injector 26 in timed relationship with the operating cycle of the engine, whereby, at or near the end of the compression stroke of the piston 28, a full fuel/air charge is disposed between the working face 32 of the piston and the surrounding fixed walls of the block 12 and head 14. The charge is ignited by the spark plug 24 in appropriate timed relationship with the operating cycle of the engine, whereby reaction of the fuel and air above the working face of the piston releases heat energy to drive the piston in a direction causing expansion of the combustion chamber (downwardly as viewed in FIG. 1) and to rotate the engine crankshaft to produce work.

In the embodiment of the invention illustrated in FIG. 1, the combustion chamber is identified generally at 40 and constitutes the total volume defined by the working face 32 of the piston 28 and the fixed surfaces of the block 12 and head 14 defining the confines of the combustion chamber 40.

In accordance with this invention, at and near the minimum volume position of piston 28 (the point at or near which the volume of combustion chamber 40 is minimum), the combustion chamber 40 is temporarily divided into two chambers A and B with a restricted passageway 42 connecting the chambers A and B. This is achieved by shaping the piston and the fixed combustion chamber walls so that when the piston approaches and is at its minimum volume position, an effective partition between chambers A and B is formed. Chamber A is referred to as the "ignition" chamber having volume $V_A$ and chamber B is referred to as the "resonating" chamber having volume $V_B$. The relationships between the geometrical configurations of chambers A and B, as well as passageway 42 and working face 32 of the piston are critical to the achievement of the combustion cycle characterizing the present invention.

FIG. 2 illustrates a view taken along line 2—2 of FIG. 1, showing the restricted passageway 42 between ignition chamber A and resonating chamber B. FIG. 3 illustrates an exemplary embodiment of the working face 32 of piston 28. It will be observed from FIG. 3 that the restricted passageway 42 is disposed between chambers A and B so that it terminates at one end in chamber A and at its other end in chamber B where the opposed wall surfaces begin to diverge. In FIG. 3, the shaded area 43 illustrates the length (from left to right as shown in FIG. 3) and width (distance of passageway 42 over a segment of the working face of the piston having an arc length $\theta$) of the passageway 42 as projected on the working face 32 of piston 28.

In accordance with the present invention, at the moment of ignition of the charge in the combustion chamber 40, virtually all of the fuel is disposed in chamber A and chamber B contains mostly air with an insignificant amount of fuel (i.e., insufficient to sustain work producing combustion). Consistent with the principles described in U.S. Pat. No. 4,592,318, vibrational wave energy generated by combustion of the charge in chamber A induces Helmholtz resonance in chamber B across passageway 42 when the piston 28 is at and near its Top Dead Center (TDC) or minimum volume position. In the invention described in the aforementioned patent, the equivalent of chamber A occupied the entire zone above the working face of the piston and the equivalent of chamber B was constituted by a fixed volume recess within the piston beneath its working face. The chambers A and B were connected by a restricted passageway or gap disposed around a circumferential length of the piston its working face, so that the volume B essentially remained constant during the operating cycle of the engine. Helmholtz resonance was induced in chamber B to produce periodic pumping of air from chamber B into chamber A via the restricted passageway throughout the combustion event.

The present invention envisions a dynamic resonating chamber volume $V_B$ that is created only when the moving piston element approaches and is at its minimum volume position, thereby avoiding the need to provide a separate fixed air reservoir chamber within the piston or other engine component. Using a dynamic resonating chamber enables very rapid achievement of the pumping effect within the overall combustion chamber near and at the minimum volume position of the piston, producing smoother and more efficient combustion within a very brief time span as compared with the time span envisioned in the system described in U.S. Pat. No. 4,592,318.

Thus, in accordance with the present invention, chamber A constitutes an ignition chamber and chamber B a resonating air reservoir chamber connected by a passageway 42 having a critical geometric configuration. There now follows a discussion of the various parameters of the chambers A and B, as well as passageway 42. The discussion assumes familiarity with the principles set forth in U.S. Pat. No. 4,592,318.

In FIG. 4 there is illustrated a simple Helmholts resonator chamber 44 having a "neck" portion 46. When the air in the neck 46 is subjected to an exciting frequency that corresponds with the natural resonant frequency of gas in chamber 44 at the temperature extant therein, a resonant condition occurs wherein the gas will be excited at its Helmholtz resonant frequency and will remain excited with relatively low levels of input energy, provided that the resonance condition is maintained. The principles are well known and described in scientific textbooks. In the system described in U.S. Pat. No. 4,592,318, the Helmholtz resonating chamber used in the invention therein described was constituted by a fixed volume chamber disposed within the piston, with the restricted passageway around the peripheral top portion of the piston constituting the "neck" of the resonating chamber. In accordance with the present invention, as shown in FIG. 5, a portion of the resonating chamber 44 corresponding roughly with the shaded portion shown in FIG. 4 is formed above the piston within the combustion chamber when the piston is at and near its minimum volume position as shown in FIG. 5. In this view, the piston 28 is shown at its minimum volume position (TDC) and volume B has been established to satisfy requirements for a Helmholtz resonator to be driven in response by periodic combustion wave energy in adjacent chamber A.

While a generally upwardly arched spherical surface 48 is seen to define volume $V_B$ above the working face 32 of piston 28 in FIG. 5, it is to be understood that various other configurations of surface 48 are envisioned by this invention to enable custom designing of Helmholtz resonator chambers in virtually any type of engine. Moreover, the invention contemplates utilizing different curvatures of resonating chamber walls (both fixed wall surfaces and moving piston wall surfaces) as well as ignition chamber walls to enable proper tuning of the chambers and the achievement of the wave interaction effect resulting from the invention. It is to be understood that the invention has particular application in a retrofit situation in which minimum alteration to existing engine components is desired or possible.

Accordingly, by way of examples of preferred embodiments, the curvature of the upper surface of the resonator chamber B can be generally arched upwardly as shown in FIG. 5, within the limits of the formula:

$$\frac{d^2y}{dx^2} < 0 \quad (1)$$

where coordinates x and y respective lie on orthogonal lines extending perpendicular and parallel to the primary direction of motion of the working face 32 of the piston 28 as it approaches adjacent fixed wall section 48 of chamber B at and near its minimum volume position. As shown in FIG. 5, abscissa x generally lies on a line extending parallel to a line connecting chambers A and B through restricted passageway 42, while ordinary y lies on a line extending generally parallel to the primary direction of motion of piston 28 relative to fixed surface 48. The above formula (1) defines a surface that arches upwardly and which, oriented as shown, will not "retain a liquid substance." The present invention envisions other curvatures for surface 48. For example, as shown in FIG. 6, surface 48 could be arched downwardly and would be defined by the formula:

$$\frac{d^2y}{dx^2} > 0 \quad (2)$$

In FIG. 7, surface 48 is flat and would be defined by the formula:

$$\frac{d^2y}{dx^2} = 0 \quad (3)$$

In FIG. 6, curvature of surface 48 in accordance with Formula (2) results in a curve that arches downwardly within the frame of reference of coordinates x and y, and forms a curvature that would "retain a liquid substance." It must be kept in mind that the curvatures of surface 48 herein described must be viewed as curved lines within the coordinates x and y as shown in FIG. 5 which may be considered as being "arched" upwardly or downwardly, "concave", "convex" or flat, depending upon the point of view from which the surfaces are observed.

As shown in FIG. 8, it is also envisioned in accordance with the present invention that the working face 32 of piston 28 can be recessed as shown at 50 to define at least a part of chamber B. In this example, surface 50 can be described by the limiting conditions of formula (2) (arched downwardly).

Figure 9:
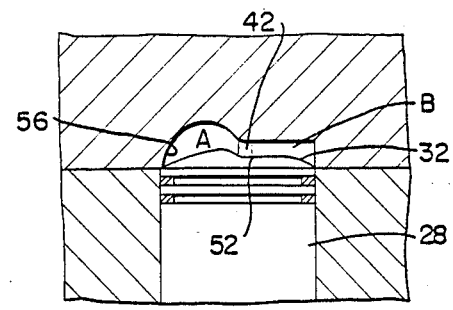
Figure 10:
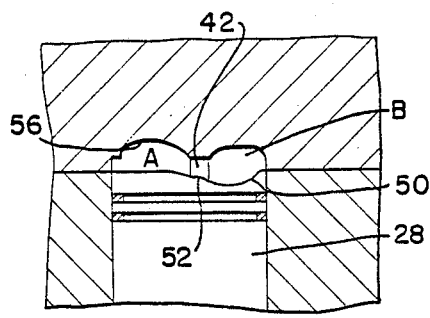
Figure 11:
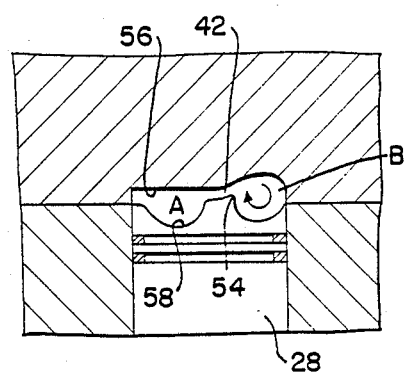

As shown in FIG. 9, in accordance with another preferred embodiment of the invention, a portion of the restricted passageway 42 can be formed by an undercut portion 52 of working face 32 of piston 28. In FIG. 10, both a portion of the restricted passageway 42 and part of chamber B is formed by undercut portions 50,52 of piston 28. In FIG. 11, piston 28 is provided with an outwardly protruding portion 54 which, as piston 28 approaches its minimum volume position, tends to cause whirling motion of gas in chamber B.

Figure 12:
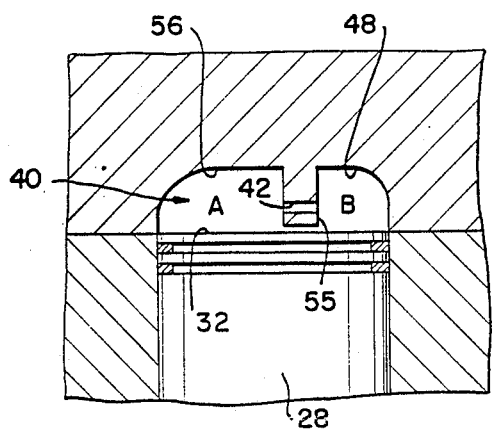

Still another embodiment is illustrated in FIG. 12, wherein passageway 42 is not disposed between working face 32 of piston 28 and the adjacent fixed surfaces of combustion chamber 40, but rather is provided in the form of an aperture within a fixed abutment element 55 that may be integrally formed as an extension of upper surfaces 48 and 56 of chambers B and A, respectively, or which may be formed as a separate attachment secured to the upper end of the combustion chamber 40 by appropriate securing means (not shown).

As also shown in FIGS. 6–11, the profiles of the fixed wall 56 of ignition chamber A can be defined by the formulas (1), (2) and (not illustrated) (3). Moreover, the working face of piston 28 constituting at least part of chamber A also can be configured in accordance with formulas (1), (2) and (3). These are variously illustrated in FIGS. 1–3 and 6–12. For example, as shown in FIG. 3, recessed portion 58 of piston 28 is contoured to provide desired volume $V_A$ in chamber A to achieve the certain ratios needed to establish volumetric relationships between chambers A and B and to provide other benefits, such as, for example, better concentration of fuel in chamber A.

Figure 13:
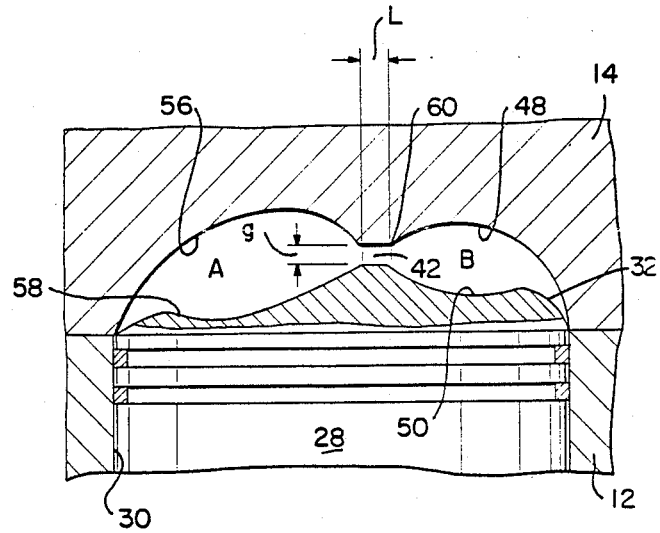
FIG. 13 is an enlarged, simplified view of the combustion chamber shown in FIG. 1 to better illustrate the details of same.

FIG. 13 illustrates a typical preferred embodiment of the invention and in particular enables a detailed observation of the geometric relationships between elements constituting combustion chamber 40 at and near its minimum volume condition. As stated previously, combustion chamber 40 is temporarily divided into an ignition chamber A having volume $V_A$ and a resonating chamnber B having a volume $V_B$ when piston 28 is at and near its minimum volume position. Chambers A and B are connected by a restricted passageway 42 defined in part by a fixed wall section 60 and, in this embodiment, a portion of the working face 32 of piston 28. Passageway 42 has an average transverse dimension g (between working face 32 of piston 28 and the adjacent fixed wall of the combustion chamber) across its width (left to right in FIG. 2) measured approximately perpendicular to its length L which extends generally along a diametrically extending line connecting chambers A and B. As shown in FIG. 2, the transverse dimension g may not be constant over entire width of passageway 42, depending upon the geometric configuration of the passageway. Passageway 42, moreover, has a cross-sectional area S measured in a transverse plane extending across distance g and the width of the passageway (i.e., a vertical plane through passageway 42 in the plane of FIG. 2). The volume $V_P$ of the passageway, therefore, would be defined as $S \times L$. In effect, passageway 42 is configured to satisfy requirements for the neck portion of a Helmholtz resonator formed by chamber B in accordance with relationships to be defined below. As seen in FIG. 3, projection of the passageway 42 on the working face 32 of piston 28 appears as shaded area 43.

With reference to FIG. 13, to establish the relationships between chambers A, B and passageway 42 to achieve the objectives of this invention, it is assumed that, for a particular fuel, combustion of charge in volume $V_A$ beginning with ignition will proceed at a certain temperature $T_A$ and will produce periodic vibrational waves of frequency $F_A$ which travel near the speed of sound in the ignition chamber in accordance with well known particles. The periodic combustion wave energy will be transmitted across ignition chamber A and intersect passageway 42, through which it will be transmitted into resonating chamber B. Chamber B is configured so that its natural resonating Helmholtz frequency $F_B$ closely matches the combustion wave frequency $F_A$ at the temperature extant in chamber B when combustion is occurring in chamber A so that the gas in volume $V_B$ will be excited at the Helmholtz frequency by frequency $F_A$. Preferably, the maximum linear dimensions within chamber B and volume $V_P$ of passageway 42 are generally less than $\frac{1}{4}$ wavelength of $F_B$ at the temperature extant in chamber B during combustion in chamber A.

In the embodiment shown in FIG. 13, for example, volume $V_A$ is defined at least in part by upper fixed wall 56 curved according to Formula (1) above and a movable wall 58 constituting part of the working surface 32 of piston 28, the wall 58 being curved generally in accordance with Formulas (1) and (2) above. In chamber B, upper wall surface 48 is fixed and at least in part is curved according to the limits defined in Formula (1) above, while another portion of the wall defining chamber B is constituted in part by recessed surface 50 in piston 28, which is generally curved in accordance with Formula (2) above.

In accordance with the present invention, the fuel and air supply system for the engine always must provide a charge distribution that is stratified or otherwise internally separated so that virtually all of the fuel of each charge at the moment of ignition is contained within ignition chamber A while only very minor or insignificant amounts of fuel (insufficient to sustain work producing combustion) is located in the resonating chamber B. In accordance with the embodiment shown in FIGS. 1 and 2, this is achieved by providing a fuel injector in chamber A that distributes the fuel in accordance with the desired objectives of the invention so that virtually all of the fuel is contained in chamber A at the moment of ignition. By properly configuring the working surface of the piston and the contour of the fixed surfaces constituting chamber A within the combustion chamber 40, fuel injected through fuel injector F can be maintained substantially on one side of the combustion chamber so that, as the piston is at and approaches its minimum volume position, virtually all of the fuel is contained in chamber A and only insignificant amounts are contained in chamber B. Other embodiments will be described herein for achieving such charge distribution within the combustion chamber in a unique manner and in particular within chambers A and B. However, it is to be understood that this invention is not to be limited by the specific manner disclosed here for distributing fuel and air between chambers A and B, since it is envisioned that other appropriate means or procedures for accomplishing such charge distribution can be applied in accordance with known principles.

In accordance with the present invention, the relationship between S, $V_B$ and L are defined as:

$$V_B = \frac{SC_A^2}{(L + kg)(2\pi F_B)^2} \text{ cm}^3 \qquad (5)$$

where (using metric units):
k is a Helmholtz correction factor numerically between 0.6 and 0.85;
L has a minimum dimension not exceeding the minimum dimension of g;
g is nominally initially determined by assuming that the transverse dimension of the pasageway is uniform along its width and is related to B in accordance with the formula:

$$g = 0.01072D + 0.1143 \qquad (6)$$

within the tolerance range of +0.050 cm and −0.0225 cm; and
$F_B$ equals K/D Hz, where K has a numerical value between 43,000 and 51,000.

In an actual working embodiment, the transverse shorter dimension g of passageway 42 would have an average value over its width corresponding to the value nominally initially determined for purposes of calculating the above formula (5).

In general, for initial design purpose, the shorter dimension g of passageway 42 is assumed to be uniform over its longer width so as to produce a cross-sectional area S. The actual area S of the passageway as constructed must then satisfy the calculated value, regardless of the particular transverse profile of the passageway 42. The passageway length L, moreover, is selected so that flame propagation between ignition chamber A and resonating chamber B is always quenched (e.g., there may be pockets or areas of slightly combustible fuel mixture in the resonating chamber B that may be driven into the chamber B ahead of the flame front after initiation of combustion but the overall composition of gas in volume $V_B$ is air with insignificant fuel, and some hydrocarbon radicals). The calculation of L to achieve flame quenching is conventional and follows accepted flame propagation quenching theory, with L usually related to the absolute temperature in the working chamber and the pressure in the working chamber according to the formula:

$$L \propto \frac{(K)(T_A)^{\frac{1}{2}}}{P_A} \qquad (7)$$

where:
K is a constant;
$T_A$ is the temperature of burning fuel in the ignition chamber; and
$P_A$ is the pressure in the working chamber.

Since it is desired to obtain a reasonably broad frequency response between $F_A$ and the resonating condition in the resonating chamber B at frequency $F_B$, the following formula relating $\theta$, L, g, $V_B$ and S is used to achieve broad tuning of the ignition and resonating chambers so that they will be responsive to a range of temperature and pressure variations occurring within the ignition chamber A:

$$\frac{n}{10} \leq 2\pi \sqrt{\frac{(L + kg)^3 V_B}{S^3}} \leq \text{approximately } n \quad (8)$$

where:
$n = 360°/\theta$ and $\theta$ is limited by: $10° < \theta < 360°$.

Accordingly, when the dimensions of $\theta$, L, g, $V_B$ and S satisfy both the formulas (5) and (8), the proper dimensional relationships in accordance with this invention will have been optimized and a desired volumetric ratio between chambers A and B will be provided for a given fuel, engine compression ratio, combustion chamber effective diameter and piston stroke so that ignition of charge in chamber A generating combustion wave energy transmitted through passageway 42 into chamber B drives the gas chamber B in a Helmholtz resonance condition. Resonance of gas within chamber B causes its periodic expansion into chamber A in a reverse direction through passageway 42 to provide unreacted oxygen in chamber A flowing in periodic waves to enhance and prolong combustion in chamber A. The entire effect is achieved while piston 28 is at and near its minimum volume position.

It is to be understood that, in accordance with principles stated in above-mentioned U.S. Pat. No. 4,592,318, resonating chamber B may contain a radical population consisting of unreacted and partially reacted hydrocarbons derived from the fuel or products of combustion, along with unreacted oxygen. Various design considerations ca be taken into account when configuring chambers A and B as well as the management of the fuel and air charge supplied to the combustion chamber to assure that a desirable population of various chemical radical species occupies chambers A and B in suitable proportions to achieve the benefits of the invention through radical enhancement of the combustion process. Throughout the description contained herein, it is to be understood that the primary purpose of resonating chamber B is to supply unreacted oxygen into the ignition chamber A in the manner disclosed; therefore, in the description and claims hereof, chamber B is usually described as containing air alone or air with insignificant amounts of fuel. Accordingly, the radical population in chambers A and B will usually be ignored for purposes of describing the invention unless reference to radical enhanced combustion is involved.

Various arrangements can be utilized, in accordance with the known principles, to optimize the length of time for the dwell of the piston at its minimum volume (TDC) position to optimize the length of time over which chambers A and B are maintained. For example, the wrist pin or gudgeon securing the piston to the connecting rod in a reciprocating piston engine can be placed off center to increase the minimum volume dwell time; the cylinder of a reciprocating piston engine can be offset from its normal center line relative to the crankshaft to increase the minimum volume dwell time; and the connecting rod length can be optimized to achieve desired piston dwell. Other arrangements known to those skilled in the field of internal combustion engines could be utilized to optimize the time of existence of chambers A and B when the piston is at and near its minimum volume position.

Figure 14:
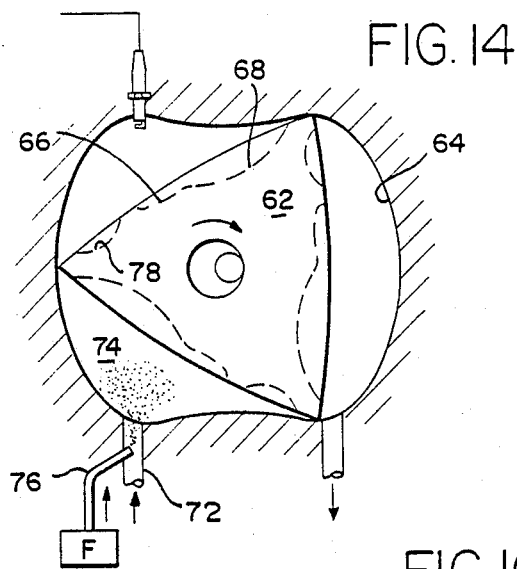
FIGS. 14–17 show an embodiment of the invention applied to a rotary piston engine.

As shown in FIGS. 14-17, the invention has application in a rotary piston engine as schematically shown in these illustrations. A rotary piston engine constructed in accordance with this invention includes a piston rotor 62 having three lobes that move within the confines of a shaped cavity 64 so as to divide the cavity into intake, compression, combustion, expansion and exhaust zones in accordance with well known rotary engine technology. In accordance with the specific embodiment of the invention illustrated in FIGS. 14-17, a rotary piston 62 would be provided with undercut recesses 66, 68 so that, at the moment of ignition in the ignition chamber A illustrated in FIG. 15, chamber A communicates with a resonating chamber B through a restricted passageway 70 defined in this embodiment at least in part by recess 66 in rotary piston 62. Chamber B, as seen in FIG. 14, would also be constituted at least in part by undercut recess 68 in rotary piston 62. The relationship between cross-sectional area S of passageway 70, volume $V_B$ of chamber B, and length L of passgeway 70 would satisfy the requirements of formula (5), assuming that the effective diametrical dimension D of the combustion chamber for the rotary engine constructed in accordance with FIG. 14 would extend transversely across chamber 64 in the direction of the width of rotary piston 62 (perpendicular to the plane of the paper in FIGS. 14-17). The shorter transverse dimension g of passageway 70 would initially be calculated based upon the aforementioned value of the effective diametrical dimension D extending widthwise across chamber 64 parallel to the rotary axis of piston 62.

It will be realized that application of this invention to standard rotary engine configurations is possible without major modification to the engine components except the working faces of the rotary piston itself. The overall configuration of the shaped chamber 64 within which rotary piston 62 rotates could be theoretically substantially maintained in a given engine to achieve the combustion process in accordance with the invention, thereby enabling retrofitting of such engines to achieve the inventive combustion process at minimum cost and expenditure of resources.

The distribution of the charge to achieve the needs of the inventive process whereby all of the fuel is contained in chamber A at the moment of ignition while substantially only air is contained in chamber B is achieved, for example, as shown in FIG. 14. Intake port 72 admits both air and fuel from separate sources into intake chamber 74 while rotary motion of piston 62 is causing intake chamber 74 to expand. Fuel is separately supplied through, for example, injector 76 under the control of injector control means F which is operated in timed synchronization with the operating cycle of the rotary engine. The timing of the supply of fuel through injector 76 is such that fuel is admitted late during the expansion of chamber 74 so that the rich portion of the mixture remains near the intake port 72 as piston 62 rotates toward the minimum volume position shown in FIG. 15. At the minimum volume position, it will be seen that the major portion of the fuel part of the charge is contained in ignition chamber A, while chamber B contains the lean part of the charge with only very minor amounts of fuel. Ignition of the fuel in chamber A is accompanied by the combustion wave energy driving chamber B in Helmholtz resonance to pump of air into chamber A from chamber B where it participates in the reaction of the fuel contained therein. As the pressure within chamber A builds to a maximum, combustion products are transferred over as is shown in FIG. 16 to the next pocket as shown in chamber 64 to drive piston 62 clockwise as shown in FIG. 16. Just as with the reciprocating piston embodiment shown in FIG. 1, the rotary piston embodiment according to FIGS. 14-17 likewise would be tuned so that chamber B will respond to a reasonably wide band of driving frequencies within chamber A.

Figure 15:
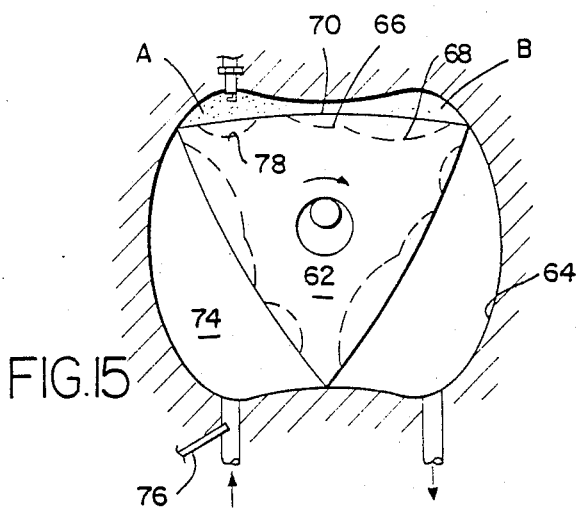
Figure 16:
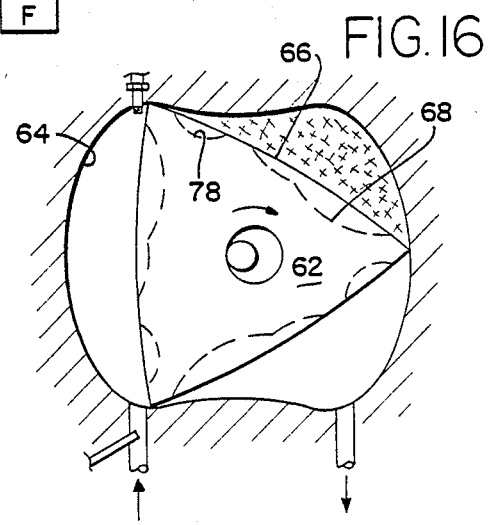
Figure 17:
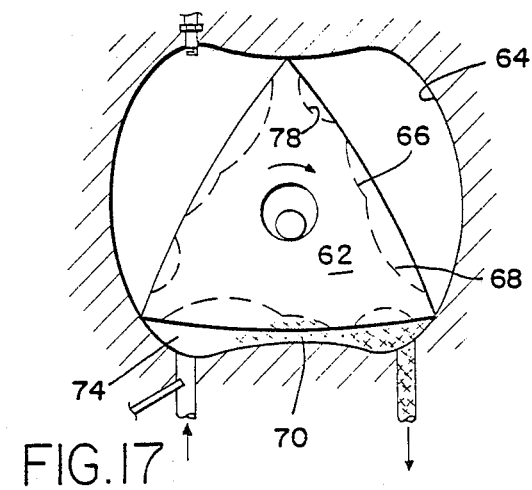

An added benefit of the passageway 70 configured in the manner shown in FIG. 15 is that, as shown in FIG. 17, circulation of exhaust gas radicals into intake chamber 74 can occur through passageway 70 to achieve the benefits of radical enhanced combustion described in U.S. Pat. No. 4,592,318.

As shown in FIGS. 14-17, chamber A can also be defined at least in part by an undercut portion 78 of the working face of piston 62. Although a fuel injector 76 has been illustrated to achieve the desired air and fuel distribution between chambers A and B, it is to be understood that any appropriate means available to those skilled in the art could be utilized to achieve the desired distribution, including a carburetor, auxiliary air valves and other appropriate means known to those skilled in this field.

Figure 21:
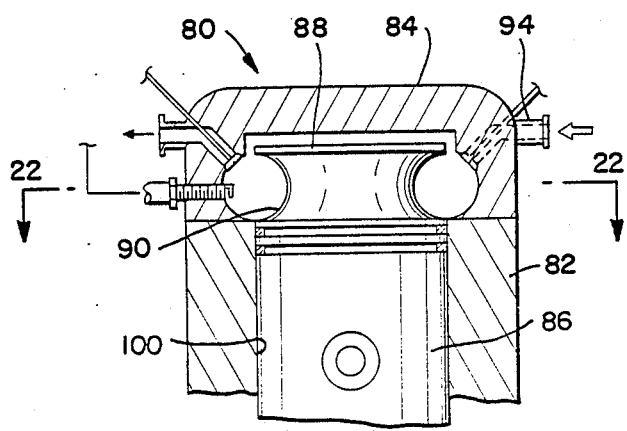
FIGS. 21 and 22 show another embodiment of the invention wherein the combustion chamber is toroidal.
Figure 22:
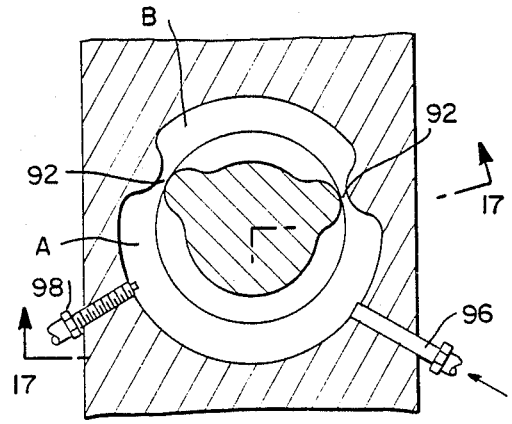

In FIGS. 21 and 22, a reciprocating piston in an internal combustion engine 80 includes a cylinder containing block 82 and a head 84 which together are shaped to provide a closed-ended variable volume combustion chamber above reciprocating piston 86. In this instance, the combustion chamber is toroidal in cross-section with the torus divided so that a half is disposed in the head 84 and a half in the upper portion of piston 86. The working face of piston 86 includes surfaces 88 and 90 which react to pressure of combustion products to drive piston downwardly within the combustion chamber to produce power.

As seen in FIG. 22, the entire toroidal combustion chamber is divided into ignition chamber A and resonating chamber B through restricted passageways 92, all of which correspond to their similarly designated counterparts in FIG. 1. The dimension g of passageways 92 would be the shorter transverse dimension across the passageway and the longer dimension would be the width of the passageway. Likewise, the relationships given in formula (5) and (6) apply as well to the toroidal chamber configuration illustrated in FIGS. 21 and 22.

Charge distribution in the embodiment of the invention illustrated in FIGS. 21 and 22 can be achieved by the timed admission of air alone into the combustion chamber via intake port 94 on the intake stroke of piston 84 followed by compression of the air by upward movement of the piston and finally by injection of fuel through injector 96 as piston 86 approaches its minimum volume position, with the fuel 96 being substantially confined within chamber A as the piston approaches its minimum volume position. Ignition of the fuel in chamber A can occur by means of a spark plug 98 which results in generation of combustion wave energy that drives gases in chamber B in resonance. Air from chamber B periodically expands into chamber A across the passageway 92 in accordance with the principles explained above in connection with FIG. 1. In FIGS. 21 and 22, the effective diametrical dimension D would be the diameter of the cylinder 100 containing piston 86.

Figure 18:
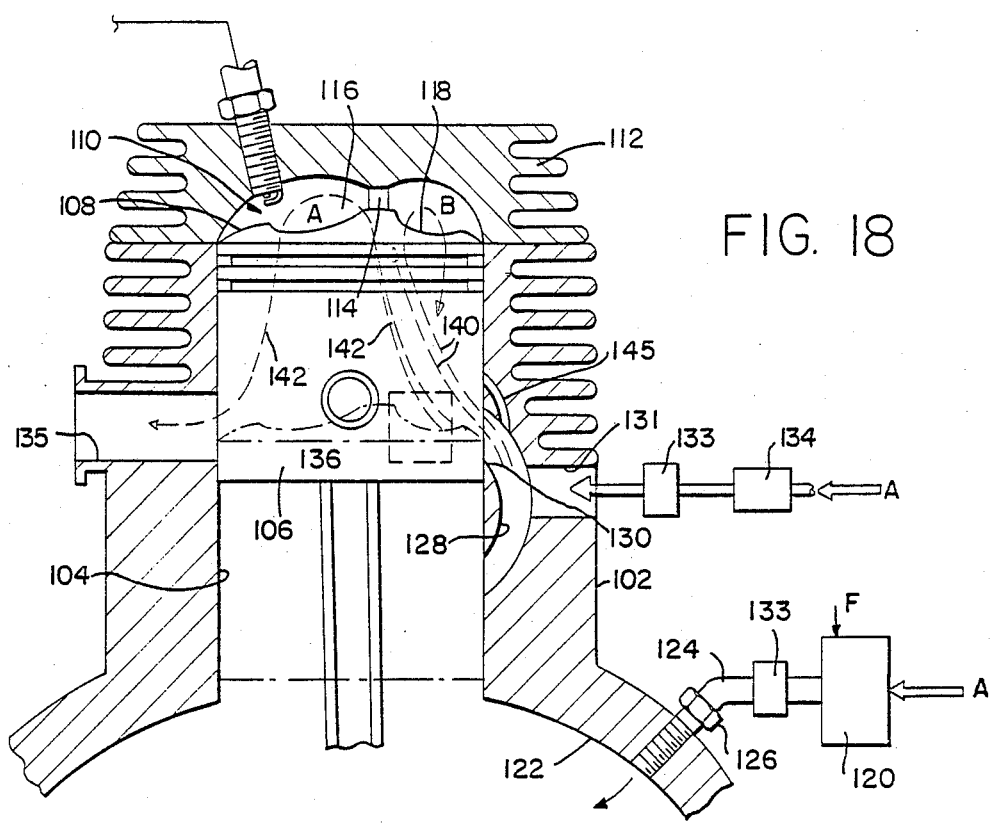
FIGS. 18–20 show a different embodiment of the engine applied to a two-stroke, air-cooled engine combustion chamber.
Figure 19:
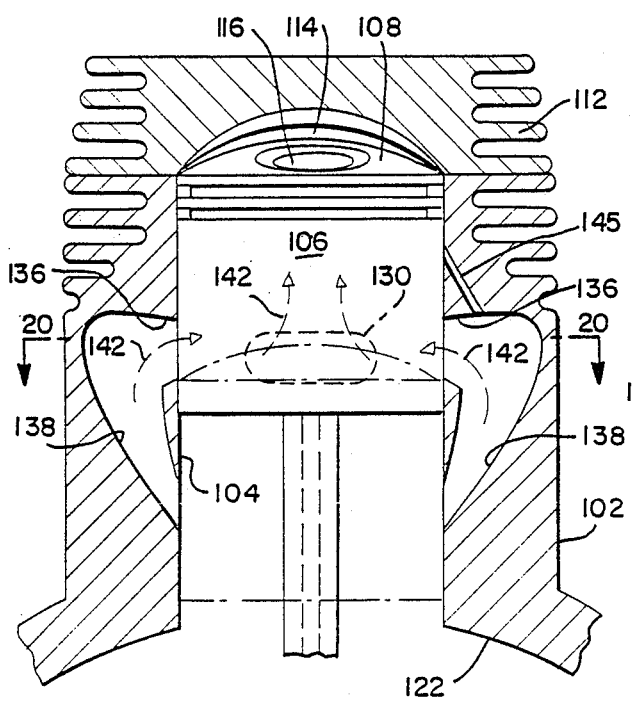
Figure 20:
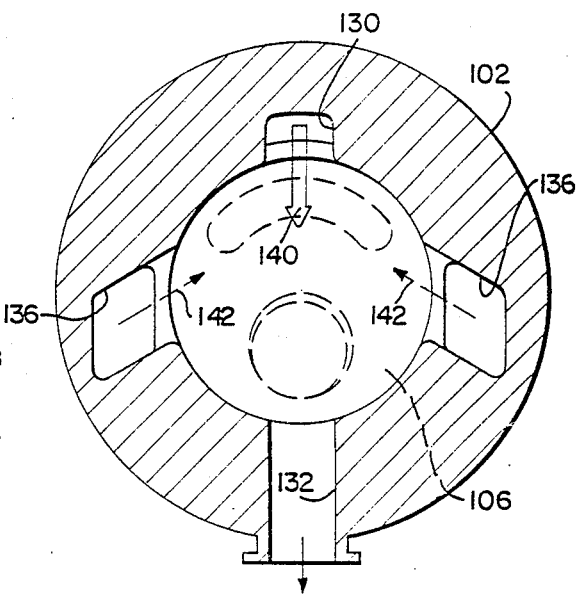

Another embodiment of the invention is illustrated in FIGS. 18-20, wherein a two-stroke, reciprocating piston, air-cooled engine is schematically represented. As shown in FIG. 18, the engine includes a block 102 containing a cylinder 104 within which reciprocates piston 106 having a working face 108 that defines the lower end of a combustion chamber 110 between the working face 108 of piston 106 and the fixed head 112. The combustion chamber 110 is divided in accordance with this invention so that, when piston 106 is at and near its minimum volume (TDC) position, the chamber is divided into ignition chamber A and resonating chamber B connected by restricted passageway 114, all of which respectively correspond to their counterparts illustrated in the four cycle engine depicted in FIG. 1. The working face 108 of piston 106 can be appropriately shaped to include recesses 116, 118 which at least in part define the lower walls of chambers A and B at the minimum volume position of piston 106.

Charge distribution within the engine shown in FIGS. 18-20 is achieved in the following manner. The engine is a two-stroke, air cooled engine in which intake of charge and discharge of exhaust products occur within two strokes of piston 106 in a generally conventional manner. Upward movement of piston 106 initially draws air and fuel intermixed at carburetor 120 into crankcase 122 via intake port 126 due to the suction effect created by piston 106 within the crankcase 122. Crankcase 122 communicates with a transfer port 130 in the sidewall of cylinder 104 via transfer conduit 128 that is in communication with crankcase 122 near the lower end of cylinder 104. A secondary air intake port 131 connected to the transfer conduit 128 is connected to a one-way valve (i.e., a reed valve) 134 which is arranged to admit secondary air into port area 131 when a predetermined suction is reached in the crankcase 122 and transfer conduit 128. Appropriate check valves 133 prevent reverse flow of gas out of ports 126 and 131.

Transfer port 130 is arranged to be uncovered by the upper end of piston 106 when the latter is at its BDC position, as shown by the position of the piston 106 shown in hidden lines in FIG. 18.

With reference to FIG. 19, additional transfer conduits 138 are provided in communication with crankcase 122 at their lower ends and with other transfer ports 136 at their upper ends. Transfer ports 136 are disposed on either side of the first above-mentioned transfer port 130, as shown in FIG. 20. Transfer ports 136, like transfer port 130, are exposed to the interior of the combustion chamber when piston 106 approaches its BDC position.

Accordingly, it will be seen that, in operation, piston 106 draws in a fuel enriched charge through conduit 124 into crankcase 122 and air into secondary air intake port 131. Secondary air drawn in through port 131 remains near the top of crankcase 122 as piston 106 reaches its top dead center (TDC) position. On the downstroke of piston 106, the gas in crankcase 122 is compressed, including the fuel rich charge drawn in through intake port 126 and the secondary air in the vicinity of port 131. Check valves 133 prevent reverse flow of gases out of ports 126 and 131. When ports 130 and 136 are exposed to the combustion chamber upon piston 106 approaching its BDC position, air with insignificant amounts of fuel is admitted into the combustion chamber through port 130 while fuel rich charge is admitted into the combustion chamber through ports 136. Subsequent upward movement of piston 106 compresses the total charge in a manner to be described below, with virtually all of the fuel contained in the charge disposed in chamber A, and with virtually only air in chamber B. Combustion of the charge drives the piston 106 downwardly to exert thrust against the engine crankshaft (not shown) until the piston reaches its BDC position, at which time transfer ports 130 and 136 are again exposed to the interior of the combustion chamber. At this time, exhaust port 135 is also exposed to the combustion chamber so that a purging of combustion products through the exhaust port 135 takes place while fresh charge is admitted through ports 130 and 136.

Transfer ports 130 and 136, along with the combustion chamber surfaces and the surfaces of piston 106 are all arranged so that intake of charge (virtually air) through intake port 130 is directed upwardly aimed toward chamber B, as shown by flow path 140 in FIG. 18. Intake of charge through ports 136 is directed radially inwardly and somewhat upwardly towards chamber A as shown by flow path 142 in FIGS. 18 and 20. The flow path 140 of air tends to keep the fuel rich charge admitted through ports 136 moving towards chamber A so that, when piston 106 is at or near its minimum volume position as shown in FIG. 18, virtually all of the fuel portion of the charge is contained in chamber A while chamber B contains virtually air with insignificant amounts of fuel. Thus, in a two-stroke environment, structure and procedure has been developed to concentrate fuel containing charge in chamber A and virtually no fuel in chamber B to achieve the charge distribution desired to carry out improved combustion of the charge using combustion wave energy to drive chamber B in resonance with the combustion waves for enhancing the combustion process. Driving of chamber B in resonance causes periodic pumping of air contained in chamber B into chamber A during the combustion event while piston 106 is at and near its minimum volume position.

Appropriate controls are provided, of course, to vary the fuel mixture at carburetor 120 and to control the amount of secondary air supplied through valve 134. It is also to be understood that carburetor 120 and valve 134 could be modified in accordance with principles well known to those skilled in internal combustion technology to control the desired total fuel to air ratio as well as the fuel to air ratio leaving carburetor 120. Moreover, it is to be understood that the geometric configuration of the work face 108 of piston 106 and the upper wall of chamber A can be adjusted to achieve the circulation of charge and exhaust fluids in accordance with the general flow depicted by arrows 140 and 142. The fine tuning of chamber and piston configurations also keeps chamber B relatively free of fuel ensures that only very lean mixture comprising mostly air and residual gases (i.e., radicals) discharged into Chamber A to combust the fuel portion of the charge in chamber A while piston 106 is at and near its minimum volume position.

It is to be understood that, while only a single secondary air transfer port 130 has been illustrated in FIGS. 18-20, multiple ports could be utilized. Moreover, additional ports 136 could be interspersed with ports 130 to provide optimum circulation of charge and purging of the combustion chamber during the exhaust event. In addition, the invention contemplates providing a combustion products bleed port or ports 145 for transferring combustion products into the regions of charge intake ports 130 and 136 to seed the incoming air and fuel with partially reacted hydrocarbon radicals to obtain radical enhancement of the combustion process as disclosed in U.S. Pat. No. 4,592,318.

The present invention furthermore contemplates an adaptive engine tuning system for controlling the air to fuel ratio of the charge supplied to the working chamber of the engine. If spark ignition is used to initiate combustion, spark advance setting also may be controlled in addition to the air to fuel ratio to optimize engine performance. The objective is to maximize "Run Quality Index" (RQI) of the engine in accordance with the principles set forth in U.S. Pat. No. 4,592,318.

Thus, as a starting point, a typical engine embodying a combustion chamber configuration constructed in accordance with this invention, for example engines of the type illustrated in FIGS. 1, 14, 18 and 21, would be completely "mapped" (i.e., the relationships of engine operating variables would be established and plotted) with the engine running on a suitable test stand to establish for any particular engine the relationship between air to fuel ratio; spark timing; indicated horsepower; fuel flow rate; and emissions (unburned hydrocarbons and carbon monoxide, in particular).

Figure 24:
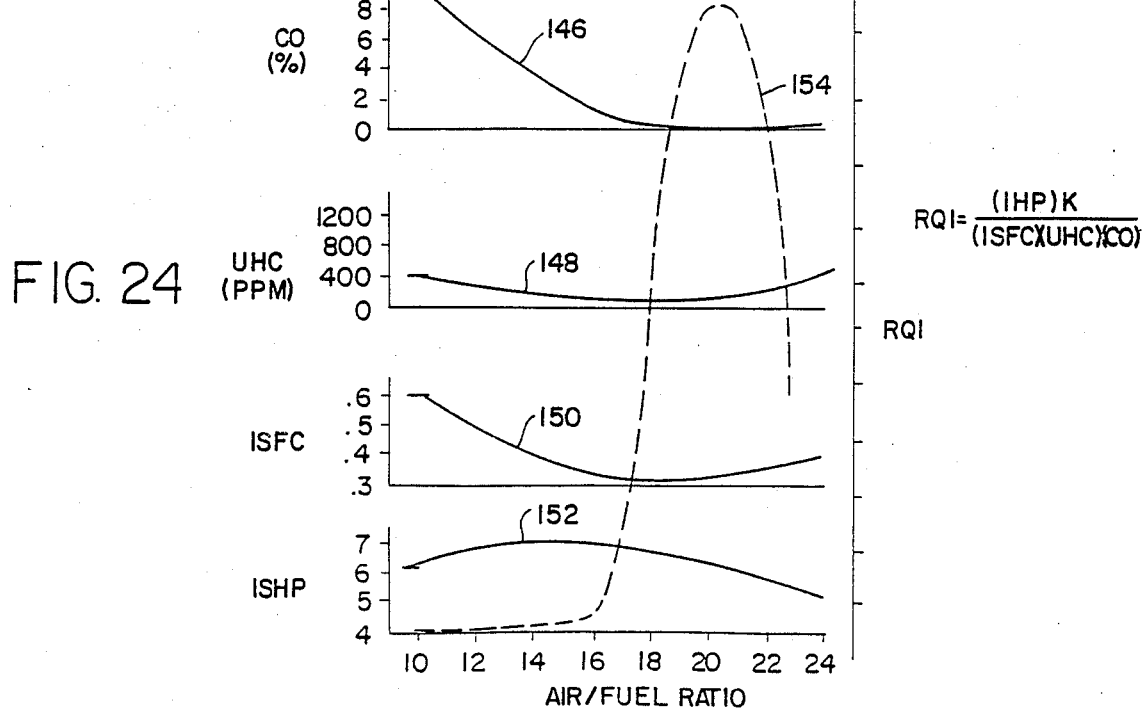
FIG. 24 is a collection of theoretical graphs of data that illustrate how the Run Quality Index (RQI) for an engine embodying the invention is calculated.

As shown in FIG. 24, a set of curves 146, 148, 150 and 152 is generated from the engine mapping procedure to show how carbon monoxide (CO), unburned hydrocarbon (UHC), indicated specific fuel consumption (ISFC) and indicated horsepower (IHP) relate to air/fuel ratio for the engine over its operating range. It should be noted that experimental tests in the laboratory indicate that an air to fuel ratio of approximately 16:1 at best power and approximately 20:1 at best economy will consistently be indicated for all engines when the piston and combustion chamber geometries established by the formulas (5) and (6). Thus, as set forth in the above-mentioned U.S. Pat. No. 4,592,318, an initial fuel and air distribution system can be established for the engine using a piston and combustion chamber configuration in accordance with this invention so that an overall air to fuel ratio of the charge between 16:1 at best power and 20:1 at best economy is provided. To achieve maximum attainable practical efficiency for the engine, the present invention relates data obtained from curves 146, 148, 150 and 152 to produce curve 154 indicative of the "Run Quality Index" (RQI), which is mathematically computed according to the following formula:

$$RQI = \frac{(IHP)K}{(ISFC)(UHC)(CO)} . \tag{9}$$

In FIG. 24, RQI is shown by curve 154. The RQI curve thus relates, in effect, what is supplied to the combustion chamber with what is thrown away in the exhaust stream to provide a sharply peaked curve 154 that indicates a best air to fuel ratio for best practical running of the engine. It will be seen that, at maximum RQI, the engine is operating at its maximum practical efficiency within its speed and load range. Its practical efficiency is not necessarily the same as the maximum theoretical efficiency of the engine under the same conditions. The maximum RQI curve is intended to provide a target for establishing optimum air to fuel ratio and spark timing during actual engine operation, taking into account the dynamic system of the engine.

Figure 23:
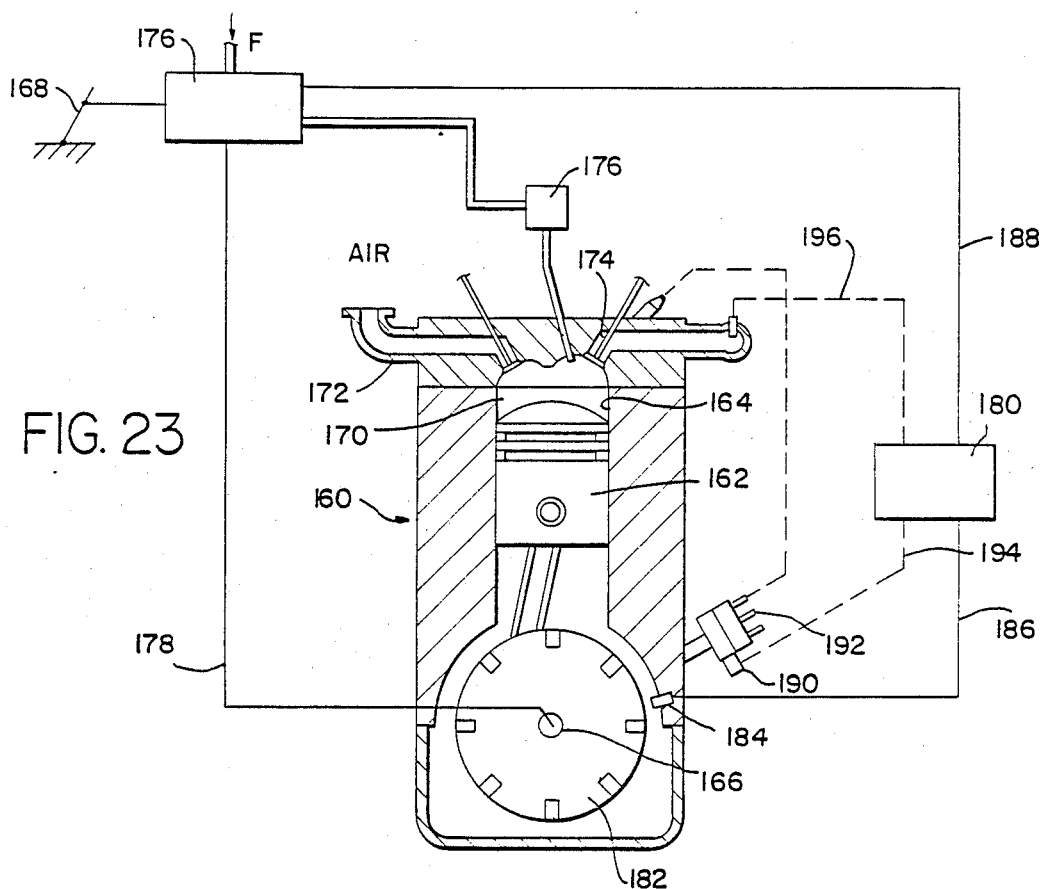
FIG. 23 schematically illustrates a direct fuel injected embodiment of the invention with an air-to-fuel ratio control system and an engine parameter sensing system.

It is assumed that during the engine mapping procedure previously referred to, the best air to fuel ratio and ignition timing that produces best RQI at each engine test RPM will have been determined. With reference to FIG. 23, a typical engine 160 embodying the present invention is schematically illustrated to show the principles utilized for obtaining best RQI engine operation. Piston 162 reciprocates within cylinder 164 to drive crankshaft 166 in rotation to produce output power at various engine speeds determined by engine speed setting element 168. In this example, the combustion chamber 170 above piston 162 is configured in accordance with principles described herein, including the division of the combustion chamber 170 into ignition and resonating chambers when piston 162 is at and near its minimum volume position. Air is drawn into the combustion chamber through intake port 172 and combustion products are discharged through exhaust port 174. In the engine embodiment illustrated in FIG. 22, ignition chamber A would be to the right in communication with exhaust port 174, while the resonating chamber B would be located to the left adjacent inket port 172.

The fuel portion of each charge admitted into the combustion chamber 170 of engine 160 is provided through a fuel injector assembly 176 that directly injects fuel into the ignition chamber in timed relationship with engine operation. Fuel control system 176 regulates operation of fuel injectors 176 as well as the amount of fuel supplied to the engine within each combustion chamber. Feedback of appropriate engine speed signals to controller 176 would be provided, for example, by electrical signals transmitted over line 178. In addition, engine fuel supply is controlled by a lean limit control system 180 similar to that described in U.S. Pat. No. 4,368,707, which system is further described in the aforementioned U.S. Pat. No. 4,592,318. Essentially, the lean limit control system 180 sense instantaneous engine power output by sensing instantaneous angular velocity of flywheel 182 of engine 160 by means of an appropriate magnetic pickup 184 which senses the instantaneous velocity of the passing flywheel teeth adjacent the pickup. The velocity signal is processed to produce an instantaneous acceleration (or deceleration) signal that is transmitted to and processed by the central control unit 180 via line 186. The central control system 180 "interprets" the instantaneous acceleration or deceleration signals as instantaneous power readings of the engine and instructs the fuel controller 176 via line 188 to "go lean" or "go rich", whereupon the fuel supplied to the ignition chamber is appropriately adjusted. The specific air to fuel ratio that is sought by the central control system 180 corresponds with the air to fuel ratio that produces best RQI as shown by curve 154 in FIG. 23. When the desired air to fuel ratio is established, the engine is operating at its maximum "attainable" efficiency, in the sense that it is operating under conditions that strike the best balance between the fuel supplied to and the power demanded of the engine.

While the engine 160 may operate over a Diesel cycle, it may also be desired to operate the engine over an Otto cycle using spark ignition. In the latter situation, in addition to an air to fuel ratio controller, a spark timing controller 190 may be utilized to control the advance/retard setting of distributor 192 so that for each RPM of engine operation as observed by the pickup 184, the optimum spark setting for best RQI will be established in accordance with the appropriate setting determined by the previous engine mapping tests. Thus, the central controller 180 would include, in addition to the lean limit control system just discussed, a sensor for receiving or deriving an engine RPM signal from the flywheel pickup 184 and would generate a signal in response to the speed signal that controls the spark advance mechanism 190 at the distributor. The signal from the central control system 180 can be transmitted to the spark setting controller 190 via line 194. Moreover, the central control system 180 may receive an exhaust temperature input signal via line 196 if necessary or desired for any given engine.

In an engine utilizing the present invention, it is desirable that the working face of the piston that constitutes at least part of the resonating chamber be comprised of a material having a heat transfer coefficient and be geometrically configured such that the maximum temperature of gas in the resonating chamber during the major portion of the combustion of the charge in the ignition chamber is maintained below that at which the onset of knock in the charge occurs in the ignition chamber over the operating range of the engine. This avoids engine knock that might otherwise occur under certain engine operating conditions. Further control over knock is possible utilizing the present invention by maintaining the resonant acoustic period shorter than the reaction time of the Otto ignition knock processes.

It is to be understood that the passageway 42 of FIG. 1 could be established in a fixed or piston wall defining the combustion chamber, as shown in FIGS. 25–27. In FIGS. 25 and 26, the passageway 42 between chambers A and B is respectively located in the piston and fixed wall surface areas; in FIG. 27, passageway 42 is divided so that it is located in both the fixed and piston wall surface areas. In all embodiments shown in FIGS. 25–27, the passageway 42 is a perament opening extending through a wall or piston surface.

An additional embodiment of the invention is illustrated in FIGS. 28 and 29, wherein the ignition chamber volume $V_A$ is disposed above piston 200 and is defined by the fixed wall of the head 202 at its upper end and by a part of the working face of piston 200 at its lower end. The resonating chamber volume $V_B$ is defined by a toroidal chamber 204 that is formed partly in the head 202 and partly in the working face of the piston 200. As shown in FIG. 29, the chamber volume $V_B$ extends fully 360° around the combustion chamber between piston 200 and head 202. Appropriate fuel injector means and spark igniting element can be provided in ignition chamber A to supply fuel to the chamber and ignite same after compression of the charge. The restricted passageway 206 corresponds with the restricted passageway 42 illustrated in the other embodiments and is constructed to satisfy the mathematical and dimensional relationships disclosed herein (i.e., formulas (5), (6) and (8)).

As shown in FIG. 29, gap 204 extends over area 208 of piston 200, and, in this embodiment, is continuous around the periphery of chamber A. It is within the scope of the invention to make the passageway 206 discontinuous between the chambers. It should be noted that, if the passageway were discontinuous, the clearance between the head 202 and working face of piston 200 in areas of the region 208 would be minimal.

It will be understood that this description is of preferred embodiments of the invention only and various changes to the specific structure or process described could be made by a person skilled in the art without departing from the scope of the invention, as defined in the ensuing claims.

What is claimed is:

1. In an internal combustion engine including a movable piston in a variable volume combustion chamber having an effective diametrical dimension D and defined in part by fixed walls and in part by a working force of the piston, intake and exhaust valve means for controlling flow of charge and exhaust products to and from the combustion chamber; and fuel and air supply means for preparing and supplying a charge to the combustion chamber; the improvement comprising, said combustion chamber is configured such that, at and closely proximate the minimum combustion chamber volume position of the piston, the combustion chamber is effectively temporarily divided into an ignition chamber having a volume $V_A$ and a resonating chamber having a volume $V_B$ with a temporary restricted connecting passageway means between said chambers, said temporary passageway being effectively removed as the piston moves away from its minimum volume position, said passageway means having a length L measured along a line connecting $V_A$ and $V_B$, an average transverse dimension g measured across its width approximately perpendicular to the length L, a cross-sectional area S at its transverse dimension g, and a volume $V_P$ of $S \times L$; the ignition of each charge producing periodic combustion wave energy of frequency $F_A$ which travels near the speed of sound $C_A$ within said ignition chamber at approximately the autoignition temperature of the charge in said ignition chamber; said passageway dimensions g and L being arranged to quench flame propagation between $V_A$ and $V_B$ during substantially the time the piston is at and closely proximate its minimum volume position; said resonating chamber and passageway means arranged to constitute a Helmholtz resonator having a resonant frequency $F_B$ at the temperature extant in $V_B$ while combustion is occurring in $V_A$, with $F_A$ and $F_B$ being approximately equal to each other; the maximum linear dimensions of $V_B$ and $V_P$ being generally less than ¼ wavelength of $F_B$ at the temperature extant in $V_B$ during combustion in $V_A$; said intake and exhaust valve means and said fuel and air supply means being arranged to establish a charge distribution in the combustion chamber such that, at the moment of ignition thereof, substantially all the fuel of the charge is in the ignition chamber and substantially only air with an insufficient amount of fuel to support work-producing combustion is in the resonating chamber; and the relationships between S, $V_B$ and L being defined as:

$$V_B = \frac{SC_A^2}{(L + kg)(2\pi F_B)^2} \text{ cm}^3$$

where (using metric units):

k is a Helmholtz correction factor numerically between 0.6 and 0.85;

L has a minimum dimension not exceeding the minimum dimension of g;

g is nominally initially determined by assuming that the transverse dimension g of the passageway is uniform along its width and is related to D in accordance with the formula:

$$g = 0.1072D + 0.1143$$

within the tolerance range of $+0.050$ cm. and $-0.25$ cm.; and $F_B$ equals K/D Hz, where K has a numerical value between 43,000 and 51,000.

2. The improvement in an internal combustion engine as claimed in claim 1, wherein at least part of volume $V_A$ is defined by a section of the working face of the piston having a curvature $d^2y/dx^2 > 0$, where coordinates x and y, respectively lie on orthogonal lines extending perpendicular and parallel to the primary direction of motion of the working face of the piston as the piston approaches the adjacent fixed wall section of the ignition chamber at and near its minimum volume position, the line including coordinate x extending generally parallel to a line connecting $V_A$ and $V_B$.

3. The improvement in an internal combustion engine as claimed in claim 1, wherein at least part of volume $V_A$ is defined by a section of the working face of the piston having a curvature $d^2y/dx^2 = 0$, where coordinates x and y, respectively lie on orthogonal lines extending perpendicular and parallel to the primary direction of motion of the working face of the piston as the piston approaches the adjacent fixed wall section of the ignition chamber at and near its minimum volume position, the line including coordinate x extending generally parallel to a line connecting $V_A$ and $V_B$.

4. The improvement in an internal combustion engine as claimed in claim 1, wherein at least part of volume $V_A$ is defined by a section of the working face of the piston having a curvature $d^2y/dx^2 < 0$, where coordinates x and y, respectively lie on orthogonal lines extending perpendicular and parallel to the primary direction of motion of the working face of the piston as the piston approaches the adjacent fixed wall section of the ignition chamber at and near its minimum volume position, the line including coordinate x extending generally parallel to a line connecting $V_A$ and $V_B$.

5. The improvement in an internal combustion engine as claimed in claim 1, wherein at least part of volume $V_A$ is defined by a section of the working face of the piston having curvatures $d^2y/dx^2 < 0$ and $d^2y/dx^2 > 0$, where coordinates x and y, respectively lie on orthogonal lines extending perpendicular and parallel to the primary direction of motion of the working face of the piston as the piston approaches the adjacent fixed wall section of the ignition chamber at and near its minimum volume position, the line including coordinate x extending generally parallel to a line connecting $V_A$ and $V_B$.

6. The improvement in an internal combustion engine as claimed in claim 1, wherein part of volume $V_A$ is defined by a fixed wall section of the ignition chamber adjacent the working face of the piston when the piston is at and near its minimum volume position, said fixed wall section having a curvature $d^2y/dx^2 > 0$, where coordinates x and y, respectively lie on orthogonal lines extending perpendicular and parallel to the primary direction of motion of the working face of the piston as the piston approaches the adjacent fixed wall section of the ignition chamber at and near its minimum volume position, the line including coordinate x extending generally parallel to a line connecting $V_A$ and $V_B$.

7. The improvement in an internal combustion engine as claimed in claim 1, wherein part of volume $V_A$ is defined by a fixed wall section of the ignition chamber adjacent the working face of the piston when the piston is at and near its minimum volume position, said fixed wall section having a curvature $d^2y/dx^2 = 0$, where coordinates x and y, respectively lie on orthogonal lines extending perpendicular and parallel to the primary direction of motion of the working face of the piston as the piston approaches the adjacent fixed wall section of the ignition chamber at and near its minimum volume position, the line including coordinates x extending generally parallel to a line connecting $V_A$ and $V_B$.

8. The improvement in an internal combustion engine as claimed in claim 1, wherein part of volume $V_A$ is defined by a fixed wall section of the ignition chamber adjacent the working face of the piston when the piston is at and near its minimum volume position, said fixed wall section having a curvature $d^2y/dx^2<0$, where coordinates x and y, respectively lie on orthonal lines extending perpendicular and parallel to the primary direction of motion of the working face of the piston as the piston approaches the adjacent fixed wall section of the ignition chamber at and near its minimum volume position, the line including coordinates x extending generally parallel to a line connecting $V_A$ and $V_B$.

9. The improvement in an internal combustion engine as claimed in claim 1, wherein at least part of volume $V_B$ is defined by a piston wall section having a curvature $d^2y/dx^2>0$, where coordinates x and y, respectively lie on orthogonal lines extending perpendicular and parallel to the primary direction of motion of the working face of the piston as the piston approaches the adjacent fixed wall section of the ignition chamber at and near its minimum volume position, the line including coordinate x extending generally parallel to a line connecting $V_A$ and $V_B$.

10. The improvement in an internal combustion engine as claimed in claim 1, wherein at least part of volume $V_B$ is defined by a piston wall section having a curvature $d^2y/dx^2=0$, where coordinates x and y, respectively lie on orthogonal lines extending perpendicular and parallel to the primary direction of motion of the working face of the piston as the piston approaches the adjacent fixed wall section of the ignition chamber at and near its minimum volume position, the line including coordinate x extending generally parallel to a line connecting $V_A$ and $V_B$.

11. The improvement in an internal combustion engine as claimed in claim 1, wherein at least part of volume $V_B$ is defined by a piston wall section having a curvature $d^2y/dx^2<0$, where coordinates x and y, respectively lie on orthogonal lines extending perpendicular and parallel to the primary direction of motion of the working face of the piston as the piston approaches the adjacent fixed wall section of the ignition chamber at and near its minimum volume position, the line including coordinate x extending generally parallel to a line connecting $V_A$ and $V_B$.

12. The improvement in an internal combustion engine as claimed in claim 1, wherein at least part of volume $V_B$ is defined by a section of the working face of the piston having a curvature $d^2y/dx^2>0$ and $d^2y/dx^2<0$, where coordinates x and y, respectively lie on orthogonal lines extending perpendicular and parallel to the primary direction of motion of the working face of the piston as the piston approaches the adjacent fixed wall section of the ignition chamber at and near its minimum volume position, the line including coordinate x extending generally parallel to a line connecting $V_A$ and $V_B$.

13. The improvement in an internal combustion engine as claimed in claim 1, wherein part of volume $V_B$ is defined by a fixed wall section of the resonating chamber adjacent the working face of the piston when the piston is at and near its minimum volume position, said fixed wall section having a curvature $d^2y/dx^2>0$, where coordinates x and y, respectively lie on orthogonal lines extending perpendicular and parallel to the primary direction of motion of the working face of the piston as the piston approaches the adjacent fixed wall section of the ignition chamber at and near its minimum volume position, the line including coordinates x extending generally parallel to a line connecting $V_A$ and $V_B$.

14. The improvement in an internal combustion engine as claimed in claim 1, wherein part of volume $V_B$ is defined by a fixed wall section of the resonating chamber adjacent the working face of the piston when the piston is at and near its minimum volume position, said fixed wall section having a curvature $d^2y/dx^2=0$, where coordinates x and y, respectively lie on orthogonal lines extending perpendicular and parallel to the primary direction of motion of the working face of the piston as the piston approaches the adjacent fixed wall section of the ignition chamber at and near its minimum volume position, the line including coordinate x extending generally parallel to a line connecting $V_A$ and $V_B$.

15. The improvement in an internal combustion engine as claimed in claim 1, wherein part of volume $V_B$ is defined by a fixed wall section of the resonating chamber adjacent the working face of the piston when the piston is at and near its minimum volume position, said fixed wall section having a curvature $d^2y/dx^2<0$, where coordinates x and y, respectively lie on orthogonal lines extending perpendicular and parallel to the primary direction of motion of the working face of the piston as the piston approaches the adjacent fixed wall section of the ignition chamber at and near its minimum volume position, the line including coordinate x extending generally parallel to a line connecting $V_A$ and $V_B$.

16. The improvement in an internal combustion engine as claimed in claim 1, wherein at least part of volume $V_A$ is defined by a section of the working face of the piston having a curvature $d^2y/dx^2>0$, and at least part of volume $V_A$ is defined at least in part by a fixed wall section of the ignition chamber adjacent the working face of the piston when the piston is at or near its minimum volume position, said fixed wall section having a curvature $d^2y/dx^2>0$, where coordinates x and y, respectively lie on orthogonal lines extending perpendicular and parallel to the primary direction of motion of the working face of the piston as the piston approaches the adjacent fixed wall section of the ignition chamber at and near its minimum volume position, the line including coordinate x extending generally parallel to a line connecting $V_A$ and $V_B$.

17. The improvement in an internal combustion engine as claimed in claim 1, wherein at least part of volume $V_B$ is defined by a section of the working face of the piston having a curvature $d^2y/dx^2>0$, and at least part of volume $V_B$ is defined at least in part by a fixed wall section of the ignition chamber adjacent the working face of the piston when the piston is at or near its minimum volume position, said fixed wall section having a curvature $d^2y/dx^2>0$, where coordinates x and y, respectively lie on orthogonal lines extending perpendicular and parallel to the primary direction of motion of the working face of the piston as the piston approaches the adjacent fixed wall section of the ignition chamber at and near its minimum volume position, the line including coordinate x extending generally parallel a line connecting $V_B$ and $V_B$.

18. The improvement in an internal combustion engine as recited in claim 1, wherein part of the working face of the piston is undercut relative to surrounding piston working face surface area to form at least part of said passageway means.

19. The improvement in an internal combustion engine as claimed in claim 1, wherein said piston is arranged to reciprocate within a cylinder, said ignition and resonating chambers each comprising a continuous toroidal-shaped volume.

20. The improvement in an internal combustion engine as claimed in claim 1, wherein said piston is a rotary element having a working face rotatable within a chamber having a fixed wall and arranged so as to cyclically approach and recede from the fixed wall when rotating to define the variable volume combustion chamber, said ignition chamber being defined at least in part by an undercut portion of the working face of the piston.

21. The improvement in an internal combustion engine as claimed in claim 20, said passageway means being defined at least in part by an undercut portion of the working face of the piston.

22. The improvement in an internal combustion engine as claimed in claim 1, wherein said piston is a rotary element having a working face rotatable within a chamber having a fixed wall and arranged to cyclically approach and recede from the fixed wall to define the variable volume combustion chamber, said resonating chamber being defined at least in part by an undercut portion of the working face of the piston.

23. The improvement in an internal combustion engine as claimed in claim 1, wherein said piston is a rotary element having a working face rotatable within a chamber having a fixed wall and arranged to cyclically approach and recede from the fixed wall to define the variable volume combustion chamber, said ignition chamber and said resonating chamber each being defined at least in part by an undercut portion of the working face of the piston.

24. The improvement in an internal combustion chamber as claimed in claim 1, wherein said engine is a two-cycle, reciprocating piston engine in which the piston is arranged to reciprocate in a closed-ended cylinder and in which said intake and exhaust valve means comprises charge intake transfer and exhaust port means in the cylinder side wall periodically covered and uncovered by the piston guide during the operating cycle of the engine, charge intake for the engine occurring through intake transfer port means; the transfer intake port means, ignition chamber, resonating chamber and exhaust port being configured and located in the engine so as to cause said charge distribution established at the moment of ignition.

25. The improvement in an internal combustion engine as claimed in claim 24, wherein said intake transfer port means comprises at least a transfer port for very lean charge comprising air with an insignificant amount of fuel, and at least one transfer port for fuel rich charge containing virtually all of the fuel of the charge, said transfer ports all arranged so that charge issuing from the lean charge transfer port is directed toward the resonating chamber during each charge intake event during the operating cycle of the engine, and charge issuing from the rich charge transfer port is directed toward the ignition chamber during each charge intake event.

26. The improvement in an internal combustion engine as claimed in claim 25, said engine including a crankcase, and intaking a fuel enriched charge through said crankcase due to suction created by piston motion, and a secondary air port located between the crankcase and the combustion chamber, said engine intaking secondary air without fuel constituting part of each charge through said secondary air port due to suction created by piston motion, and wherein said secondary air is directed to the lean charge transfer port area and said fuel enriched charge is directed to the fuel rich charge transfer port area.

27. The improvement in an internal combustion engine as claimed in claim 24, wherein said ignition chamber has an upper fixed surface defined by a fixed wall section of the cylinder adjacent the working face of the piston when the piston is at and near its minimum volume position, said upper surface defined at least in part by the curvature $d^2y/dx^2 < 0$, where coordinates x and y, respectively lie on orthogonal lines extending perpendicular and parallel to the primary direction of motion of the working face of the piston as the piston approaches the adjacent fixed wall section of the ignition chamber at and near its minimum volume position, the line including coordinate x extending generally parallel to a line connecting $V_A$ and $V_B$.

28. The improvement in an internal combustion engine as claimed in claim 27, wherein said ignition chamber has a lower surface defined by a section of the working face of the piston having a curvature $d^2y/dx^2 > 0$.

29. The improvement in an internal combustion engine as claimed in claim 1, wherein the passageway transverse dimension g varies across the width of the passageway means, but the actual average transverse dimension g corresponds to said initially nominally determined value.

30. The improvement in an internal combustion engine as claimed in claim 1, wherein said piston is circular and reciprocates in a close-ended cylinder, said passageway extends over a segment of the working face of the piston, and said segment is of arc length $\theta$ between 10° and 360°.

31. The improvement in an internal combustion engine as claimed in claim 30, wherein the relationship between L, $V_B$, g and S satisifes the formula:

$$\frac{n}{10} \leq 2\pi \sqrt{\frac{(L + kg)^3 V_B}{S^3}} \leq \text{approximately } n$$

32. The improvement in an internal combustion engine as claimed in claim 1, wherein the resonating chamber walls, the passageway means, and the piston working face are arranged so as to cause vortical flow of gas in the resonating chamber as the working face of the piston approaches the adjacent fixed wall of the resonating chamber at its minimum volume position.

33. The improvement in an internal combustion engine as claimed in claim 1, wherein the fuel and air supply means is arranged to deliver a charge having a total air to fuel ratio of approximately 20 to 1 at best engine economy operation and approximately 16 to 1 at best engine power operation.

34. The improvement in an internal combustion engine as claimed in claim 1 including engine power sensing means for sensing instantaneous engine power output at each speed range setting of the engine and generating a signal proportional to said instantaneous power; and control means for receiving and processing said instantaneous power signal and causing the air to fuel ratio at each speed setting of the engine to be varied in response to said instantaneous power signal through said charge supply means to maintain engine operation at substantially the maximum attainable run quality index (RQI) of the engine at such speed, wherein RQI for each engine speed is defined by the formula:

$$RQI = \frac{(IHP)(N)}{(ISFC)(UHC)(CO)}$$

where:
IHP is Indicated Horsepower;
N is a constant to provide a useful range of numerical values for RQI;
ISFC is Indicated Specific Fuel Consumption of the engine, in pounds per hour per horsepower;
UHC typically is unburned by hydrocarbons in parts per million hexane;
CO is carbon monoxide expressed as a volume percentage; the total air to fuel ratio required to establish maximum RQI at each engine speed/range being previously determined experimentally for the engine in accordance with standard engine mapping techniques.

35. The improvement in an internal combustion engine as claimed in claim 34, said engine being spark ignited and including variable spark timing means, the improvement further comprising an engine speed sensor for generating a spark timing signal; and means for receiving said spark timing signal and adjusting the timing of said spark in response thereto at each engine speed to establish maximum RQI for the engine, the optimum spark timing for achieving maximum RQI for said engine at any particular speed having been previously established by standard engine mapping procedures.

36. The improvement in an internal combustion engine as claimed in claim 1, said working face of the piston comprising at least part of the resonating chamber being comprised of a material having a heat transfer coefficient and being geometrically configured such that the maximum temperature in the resonating chamber during the major portion of the combustion of the charge in the ignition chamber is maintained below that at which the onset of knock in the charge occurs in the ignition chamber during all engine operating conditions.

37. The improvement in an internal combustion engine as claimed in claim 1, wherein said passageway means is defined at least in part by a fixed wall section of the engine and a section of the working face of the piston when the latter is at and near its minimum volume position.

38. The improvement in an internal combustion engine as claimed in claim 1, wherein said passageway means is defined at least in part by a passageway through a fixed wall of the engine between said ignition and resonating chambers.

39. The improvement in an internal combustion engine as claimed in claim 1, wherein said passageway means is defined at least in part by a passageway through the working face area of the piston.

40. The improvement in an internal combustion engine as claimed in claim 1, wherein said passageway means is defined at least in part by a passageway through a fixed wall of the engine between said ignition and resonating chambers and at least in part by a passageway through the working face area of the piston.

41. The improvement in an internal combustion engine as claimed in claim 1, wherein said resonating chamber is toroidal in shape with a fixed surface defining one end wall of the resonating chamber and a working face of the piston defining an opposite wall of the resonating chamber, said resonating chamber being disposed in surrounding relationship relative to the ignition chamber.

42. The improvement in an internal combustion engine as claimed in claim 41, wherein the passageway between the ignition and resonating chambers is continuous about the peripheral area of the ignition chamber.

43. A process for carrying out combustion of an air and fuel charge in an internal combustion engine using a movable piston to vary an initially undivided combustion chamber volume defined at least in part by a working face of the piston and in which the charge is placed and combusted, the working face of the piston compressing at least the air portion of the charge in the undivided combustion chamber volume to a minimum volume at or near which ignition of the charge is initiated, comprising:
(1) temporarily dividing the undivided combustion chamber volume above the working face of the piston into first and second regions at or near the minimum volume position of the piston, with said regions connected by a restricted passageway means across which combustion of charge is inhibited;
(2) confining virtually all of the fuel of the charge in the first region and igniting same in said region to generate periodic combustion wave energy;
(3) arranging the passageway means and second region to behave as a Helmholtz resonator having a resonant frequency at the frequency of the periodic combustion wave energy of the prevailing temperature of combustion in the first region and driving compressed heated air in the said second region in Helmholtz resonance by the periodic combustion wave energy to cause periodic outflow of air from the second region into the first region through the passageway means while the piston is at and near its minimum volume position;
(4) expanding the combustion chamber by movement of the piston away from its minimum volume position to reestablish an undivided combustion chamber volume after the charge is ignited and after the second chamber has been driven in Helholtz resonance by the periodic combustion wave energy.

44. A process as claimed in claim 43, wherein the process is carried out within a combustion chamber having an effective diametrical dimension D, wherein the periodic combustion wave energy has a frequency $F_A$ moving at approximately the speed of sound $C_A$ within the first chamber at approximately the autoignition temperature of the charge in said first chamber after its compression, said first chamber having a volume $V_A$, said passageway means having an average transverse dimension g across its width and a length L extending between the first and second chambers, said passageway means having a transverse cross-sectional area S measured in the plane including dimension g; said second chamber having a volume $V_B$ and a resonant frequency $F_B$ corresponding to $F_A$ when the temperature of the gas in $V_B$ is the same as the combustion temperature in $V_A$, and the linear dimensions of the chamber and passageway being generally less than ¼ wavelength of $F_B$ at the temperature existing in volume $V_B$ during combustion in volume $V_A$, and wherein the following relationships are established between the first and second chambers, and the passageway:

$$V_B = \frac{SC_A^2}{(L + kg)(2\pi F_B)^2} \text{ cm}^3$$

where (metric units):

- k is a Helmholtz correction factor numerically between 0.6 and 0.85;
- L has a minimum dimension not exceeding the minimum dimension of g;
- g is nominally initially determined by assuming the passageway is uniform across its width and is related to D in accordance with the formula:

$$g = 0.1072D + 1143$$

within the tolerance range of +0.050 cm. and −0.025 cm.; and $F_B = K/D$ Hz where K has a numerical value between 43,000 and 51,000.

45. A process as claimed in claim 44 wherein the process is carried out in a cylindrical combustioon chamber closed by a fixed surface at one end and by the working face of the piston at its other end, and wherein said passageway means extends over a radial segment of the cylinder, said segment having an arc length $\theta$ between 10° and 360°, and wherein the following relationship between L, $V_B$, g and S is established:

$$\frac{n}{10} \leq 2\pi \sqrt{\frac{(L + kg)^3 V_B}{S^3}} \leq \text{approximately } n. \tag{8}$$

* * * * *